United States Patent
Ziauddin et al.

(10) Patent No.: US 10,642,831 B2
(45) Date of Patent: May 5, 2020

(54) STATIC DATA CACHING FOR QUERIES WITH A CLAUSE THAT REQUIRES MULTIPLE ITERATIONS TO EXECUTE

(71) Applicant: Oracle International Corporation, Redwood Shores, CA (US)

(72) Inventors: Mohamed Ziauddin, Pleasanton, CA (US); Yali Zhu, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 646 days.

(21) Appl. No.: 15/268,335

(22) Filed: Sep. 16, 2016

(65) Prior Publication Data

US 2017/0116271 A1 Apr. 27, 2017

Related U.S. Application Data

(60) Provisional application No. 62/245,957, filed on Oct. 23, 2015.

(51) Int. Cl.
*G06F 16/00* (2019.01)
*G06F 16/2453* (2019.01)
*G06F 16/2455* (2019.01)

(52) U.S. Cl.
CPC .. *G06F 16/24542* (2019.01); *G06F 16/24539* (2019.01); *G06F 16/24566* (2019.01)

(58) Field of Classification Search
CPC ............... G06F 12/084; G06F 12/0871; G06F 16/24539; G06F 16/24542; G06F 16/24552; G06F 16/24566; G06F 17/245; G06F 16/24553
See application file for complete search history.

(56) References Cited

U.S. PATENT DOCUMENTS 5,359,724 A 10/1994 Earle
5,367,677 A 11/1994 Stanfill
5,546,571 A 8/1996 Shan
(Continued)

OTHER PUBLICATIONS

MSDN Library, "Dimension Set Entires", NAV 2013 Documentation, dated Nov. 21, 2012, Retrieved on Sep. 13, 2017, 22 pages.
(Continued)

*Primary Examiner* — Merilyn P Nguyen
(74) *Attorney, Agent, or Firm* — Hickman Palermo Becker Bingham LLP

(57) ABSTRACT

Techniques are described herein to generate and to execute a query execution plan using static data buffering. After receiving a query with a clause that requires multiple iterations to execute, a database management system (DBMS) generates a plurality of plans that vary the order in which the database operations are executed. Within each plan, the DBMS identifies sets of rows within that plan that contain static data during execution of the query. Then, an additional step is added to each plan that includes loading the static set of rows in a database buffer cache. One or more database operations, from an iteration other than the first iteration, may be performed against the cached static set of rows. For each plan generated in this manner, a cost analysis model is applied, and the plan with the lowest estimated computational cost is selected for use as the query execution plan.

20 Claims, 11 Drawing Sheets

(56) References Cited

U.S. PATENT DOCUMENTS

| | | |
|---|---|---|
| 5,822,750 A | 10/1998 | Jou |
| 5,848,408 A | 12/1998 | Jackobsson |
| 5,905,985 A | 5/1999 | Malloy |
| 5,915,249 A * | 6/1999 | Spencer ............... G06F 16/313 |
| | | 707/742 |
| 5,943,666 A | 8/1999 | Kleewein |
| 5,960,428 A | 9/1999 | Lindsay |
| 6,298,342 B1 | 10/2001 | Graefe |
| 6,317,750 B1 | 11/2001 | Tortolani et al. |
| 6,341,281 B1 | 1/2002 | MacNicol |
| 6,345,267 B1 | 2/2002 | Lohman |
| 6,353,828 B1 | 3/2002 | Ganesh |
| 6,397,195 B1 | 5/2002 | Pinard et al. |
| 6,397,204 B1 | 5/2002 | Liu |
| 6,405,208 B1 | 6/2002 | Raghavan et al. |
| 6,385,604 B1 | 7/2002 | Bakalash et al. |
| 6,446,063 B1 | 9/2002 | Chen |
| 6,460,045 B1 | 10/2002 | Aboulnaga et al. |
| 6,484,179 B1 | 11/2002 | Roccaforte |
| 6,529,896 B1 | 3/2003 | Leung et al. |
| 6,618,729 B1 | 9/2003 | Bhashyam et al. |
| 6,711,563 B1 | 3/2004 | Koskas |
| 6,775,682 B1 | 8/2004 | Ballamkonda |
| 6,959,304 B1 | 10/2005 | Teig et al. |
| 6,965,891 B1 | 11/2005 | Jakobsson |
| 7,028,046 B2 | 4/2006 | Anjur et al. |
| 7,103,590 B1 * | 9/2006 | Murthy ............. G06F 16/24553 |
| 7,146,370 B1 | 12/2006 | Klindt |
| 7,174,327 B2 | 2/2007 | Chau |
| 7,324,991 B1 | 1/2008 | Anjur |
| 7,337,163 B1 | 2/2008 | Srinivasan |
| 7,366,730 B2 | 4/2008 | Greenfield et al. |
| 7,392,248 B2 | 6/2008 | Bakalash |
| 7,467,127 B1 | 12/2008 | Baccash et al. |
| 7,617,312 B2 | 11/2009 | Tummalapalli |
| 7,685,095 B2 | 3/2010 | Ghosh et al. |
| 7,725,425 B2 | 5/2010 | Smartt |
| 7,734,652 B2 | 6/2010 | Tamayo |
| 7,769,733 B2 | 8/2010 | Chen et al. |
| 7,774,303 B2 | 8/2010 | Shoup |
| 7,797,320 B2 | 9/2010 | Thomsen |
| 8,001,112 B2 | 8/2011 | Dombroski et al. |
| 8,041,670 B2 | 10/2011 | Bakalash |
| 8,086,645 B2 | 12/2011 | Ghosh et al. |
| 8,176,265 B2 | 5/2012 | Coon |
| 8,200,612 B2 | 6/2012 | Soylemez |
| 8,209,208 B2 | 6/2012 | Kearney et al. |
| 8,311,975 B1 | 11/2012 | Gonsalves |
| 8,396,325 B1 | 3/2013 | Kwatra |
| 8,554,761 B1 | 10/2013 | Ahmed |
| 8,660,985 B2 | 2/2014 | Wang |
| 8,788,453 B2 | 7/2014 | Bakalash |
| 8,799,209 B2 | 8/2014 | Bakalash |
| 8,954,419 B2 | 2/2015 | Apte et al. |
| 9,092,484 B1 | 7/2015 | Abraham |
| 9,177,027 B2 | 11/2015 | Kitsuregawa |
| 9,183,254 B1 | 11/2015 | Cole |
| 9,251,210 B2 | 2/2016 | Chaudhry et al. |
| 9,324,036 B1 | 4/2016 | Iyer |
| 9,727,609 B2 | 8/2017 | Su et al. |
| 9,971,808 B2 | 5/2018 | Kamath |
| 10,091,061 B1 * | 10/2018 | Peterson ............. H04L 41/0823 |
| 2002/0095397 A1 | 7/2002 | Koskas |
| 2002/0095421 A1 | 7/2002 | Koskas |
| 2003/0131215 A1 | 7/2003 | Bellew |
| 2003/0208484 A1 | 11/2003 | Chang |
| 2004/0153435 A1 | 8/2004 | Gudbjartsson et al. |
| 2004/0225639 A1 | 11/2004 | Jakobsson |
| 2004/0236786 A1 | 11/2004 | Medicke |
| 2005/0033741 A1 | 2/2005 | Dombroski et al. |
| 2005/0131800 A1 | 6/2005 | Yoaz |
| 2006/0026115 A1 | 2/2006 | Ahmed |
| 2006/0080285 A1 | 4/2006 | Chowdhuri |
| 2006/0101001 A1 | 5/2006 | Lindsay |
| 2006/0184519 A1 | 8/2006 | Smartt |
| 2006/0200772 A1 * | 9/2006 | Dhanapal ............... G06Q 10/06 |
| | | 715/760 |
| 2006/0235818 A1 | 10/2006 | Muras |
| 2006/0235823 A1 | 10/2006 | Chong |
| 2007/0027860 A1 | 2/2007 | Bestgen |
| 2007/0083489 A1 | 4/2007 | Lawande |
| 2007/0233648 A1 | 10/2007 | Zuzarte |
| 2007/0239673 A1 | 10/2007 | Barsness |
| 2007/0239691 A1 | 10/2007 | Ordonez |
| 2007/0250473 A1 | 10/2007 | Larson |
| 2007/0283356 A1 | 12/2007 | Du |
| 2008/0059415 A1 | 3/2008 | Bakalash |
| 2008/0162409 A1 | 7/2008 | Meijer |
| 2008/0172354 A1 | 7/2008 | Zuzarte |
| 2008/0215544 A1 | 9/2008 | Galindo-Legaria |
| 2008/0306903 A1 * | 12/2008 | Larson ............... G06F 16/2462 |
| 2009/0019017 A1 | 1/2009 | Chaves |
| 2009/0112793 A1 | 4/2009 | Ahmed |
| 2009/0182720 A1 | 7/2009 | Cain et al. |
| 2009/0265335 A1 | 10/2009 | Hoffman |
| 2009/0281985 A1 | 11/2009 | Aggarwal |
| 2010/0088325 A1 | 4/2010 | Goldstein |
| 2010/0191716 A1 | 7/2010 | Chen |
| 2010/0211577 A1 | 8/2010 | Shimizu |
| 2010/0299337 A1 | 11/2010 | Aurin |
| 2010/0299367 A1 | 11/2010 | Chakrabarti et al. |
| 2011/0010139 A1 | 1/2011 | Fuhrmann |
| 2011/0040745 A1 | 2/2011 | Zaydman |
| 2011/0055246 A1 | 3/2011 | Le Biannic et al. |
| 2011/0137917 A1 | 6/2011 | Boland et al. |
| 2011/0145244 A1 | 6/2011 | Kim et al. |
| 2011/0173164 A1 | 7/2011 | Bendel |
| 2011/0196857 A1 | 8/2011 | Chen |
| 2011/0252033 A1 | 10/2011 | Narang |
| 2011/0282864 A1 | 11/2011 | Collins |
| 2012/0036146 A1 | 2/2012 | Annapragada |
| 2012/0296883 A1 * | 11/2012 | Ganesh ................ G06F 3/0608 |
| | | 707/693 |
| 2012/0296942 A1 | 11/2012 | Arora |
| 2013/0006965 A1 | 1/2013 | Barbas |
| 2013/0060547 A1 | 3/2013 | Beran et al. |
| 2013/0073538 A1 | 3/2013 | Beerbower |
| 2013/0117255 A1 | 5/2013 | Liu et al. |
| 2013/0173528 A1 | 7/2013 | Betawadkar |
| 2013/0198165 A1 | 8/2013 | Cheng |
| 2013/0262443 A1 | 10/2013 | Leida |
| 2013/0275364 A1 | 10/2013 | Wang |
| 2013/0275365 A1 | 10/2013 | Wang |
| 2013/0275367 A1 | 10/2013 | Shuma |
| 2014/0052711 A1 | 2/2014 | Bamba et al. |
| 2014/0095502 A1 | 4/2014 | Ziauddin |
| 2014/0095526 A1 | 4/2014 | Harada |
| 2014/0095534 A1 | 4/2014 | Aingaran |
| 2014/0101201 A1 | 4/2014 | Yan |
| 2014/0149480 A1 * | 5/2014 | Catanzaro ............... G06F 7/766 |
| | | 708/520 |
| 2014/0181072 A1 | 6/2014 | Wong |
| 2014/0181144 A1 | 6/2014 | Kashiyama |
| 2014/0214796 A1 | 7/2014 | Barber |
| 2014/0280020 A1 | 9/2014 | Singamshetty |
| 2014/0372438 A1 | 12/2014 | Chandramouli |
| 2015/0019674 A1 * | 1/2015 | Le Van Gong ..... H04L 67/2852 |
| | | 709/213 |
| 2015/0088795 A1 | 3/2015 | Golovashkin et al. |
| 2015/0088809 A1 | 3/2015 | Kociubes et al. |
| 2015/0088856 A1 | 3/2015 | Hunter et al. |
| 2015/0088885 A1 | 3/2015 | Hopeman, IV et al. |
| 2015/0088919 A1 | 3/2015 | Hunter et al. |
| 2015/0261820 A1 | 9/2015 | Cheng |
| 2015/0269179 A1 * | 9/2015 | McClements ......... G06F 12/084 |
| | | 711/130 |
| 2015/0278309 A1 | 10/2015 | Harada |
| 2015/0379077 A1 | 12/2015 | Grosse |
| 2016/0034521 A1 | 2/2016 | Lumby |
| 2016/0179889 A1 * | 6/2016 | Chiang ............. G06F 16/24545 |
| | | 707/718 |
| 2016/0232206 A1 | 8/2016 | Hayamizu |
| 2016/0378751 A1 | 12/2016 | Kamath |
| 2016/0378754 A1 | 12/2016 | Kamath |

(56) References Cited

U.S. PATENT DOCUMENTS

| | | | | |
|---|---|---|---|---|
| 2016/0378796 A1* | 12/2016 | Hopcroft | ............... | G06F 16/316 707/692 |
| 2017/0116266 A1 | 4/2017 | Lahorani et al. | | |
| 2017/0116272 A1 | 4/2017 | Lahorani et al. | | |

OTHER PUBLICATIONS

Louiqa Raschid et al., "A Parallel Processing Strategy for Evaluating Recursive Queries", dated Aug. 1986, 8 pages.
Ashdown et al., "Oracle Database SQL Tuning Guide 12c Release 1 (12.1)", dated May 2013, 566 pages.
Ziauddin, U.S. Appl. No. 15/268,528, filed Sep. 16, 2016, Final Office Action, dated Feb. 21, 2019.
Lahorani, U.S. Appl. No. 15/268,522, filed Sep. 16, 2016, Interview Summary, dated Mar. 22, 2019.
Hunter, U.S. Appl. No. 14/033,358, filed Sep. 20, 2013, Office Action, dated Mar. 9, 2017.
Hopeman IV, U.S. Appl. No. 14/033,251, filed Sep. 20, 2013, Interview Summary, dated Dec. 27, 2016.
U.S. Appl. No. 13/587,897, filed Aug. 16, 2012, Office Action, dated Nov. 25, 2013.
U.S. Appl. No. 13/587,897, filed Aug. 16, 2012, Notice of Allowance, dated Apr. 7, 2014.
Lahorani, U.S. Appl. No. 15/268,522, filed Sep. 16, 2016, Office Action, dated Aug. 15, 2018.
Lahorani, U.S. Appl. No. 15/268,522, filed Sep. 16, 2016, Final Office Action, dated Jan. 11, 2019.
Lahorani, U.S. Appl. No. 15/268,519, filed Sep. 16, 2016, Office Action, dated Oct. 31, 2018.
Kociubes, U.S. Appl. No. 14/033,271, filed Sep. 20, 2013, Notice of Allowance, dated Aug. 2, 2017.
Kociubes, U.S. Appl. No. 14/033,271, filed Sep. 20, 2013, Interview Summary, dated Jan. 30, 2017.
U.S. Appl. No. 14/033,251, filed Jul. 30, 2015, Office Action, dated Jul. 30, 2015.
Hunter, U.S. Appl. No. 14/033,358, filed Sep. 20, 2017, Interview Summary, dated Dec. 11, 2017.
U.S. Appl. No. 14/033,251, filed Sep. 20, 2013, Final Office Action, dated Nov. 1, 2016.
Hunter, U.S. Appl. No. 14/033,358, filed Sep. 20, 2013, Interview Summary, dated Dec. 21, 2016.
Hunter, U.S. Appl. No. 14/033,358, filed Sep. 20, 2013, Interview Summary, dated May 1, 2017.
Hunter, U.S. Appl. No. 14/033,358, filed Sep. 20, 2013, Final Office Action, dated Sep. 21, 2017.
Hunter, U.S. Appl. No. 14/033,285, filed Sep. 20, 2013, Notice of Allowance, dated Apr. 19, 2018.
Hunter, U.S. Appl. No. 14/033,285, filed Sep. 20, 2013, Notice of Allowance, date Dec. 21, 2017.
Hunter, U.S. Appl. No. 14/033,285, filed Sep. 20, 2013, Interview Summary, dated Sep. 27, 2017.
Hunter, U.S. Appl. No. 14/033,285, filed Sep. 20, 2013, Interview Summary, dated Apr. 27, 2017.
Hunter, U.S. Appl. No. 14/033,285, Sep. 20, 2013, Final Office Action, dated Feb. 22, 2017.
Hopeman, U.S. Appl. No. 14/033,251, filed Sep. 20, 2013, Notice of Allowance, dated Apr. 12, 2017.
Kociubes, U.S. Appl. No. 14/033,271, filed Sep. 20, 2013, Final Office Action, dated Apr. 12, 2017.
U.S. Appl. No. 14/033,285, filed Sep. 20, 2013, Interview Summary, dated Jun. 17, 2016.
U.S. Appl. No. 14/033,358, filed Sep. 20, 2013, Office Action, dated Apr. 6, 2016.
U.S. Appl. No. 14/033,358, filed Sep. 20, 2013, Final Office Action, dated Oct. 5, 2016.
U.S. Appl. No. 14/033,358, filed Sep. 20, 2013, Office Action, dated Jun. 1, 2015.
U.S. Appl. No. 14/033,358, filed Sep. 20, 2013, Final Office Action, dated Nov. 10, 2015.
U.S. Appl. No. 14/033,358, filed Sep. 20, 2013, Advisory Action, dated Jan. 19, 2017.
U.S. Appl. No. 14/033,285, filed Sep. 20, 2013, Office Action, dated Oct. 6, 2015.
U.S. Appl. No. 14/033,251, filed Jan. 22, 2016, Interview Summary, dated Jan. 22, 2016.
U.S. Appl. No. 14/033,285, filed Sep. 20, 2013, Office Action, dated Jul. 27, 2017.
Ziauddin, U.S. Appl. No. 15/268,528, filed Sep. 16, 2016, Office Action, dated Jul. 27, 2018.
U.S. Appl. No. 14/033,285, filed Sep. 20, 2013, Final Office Action, dated May 10, 2016.
U.S. Appl. No. 14/033,271, filed Sep. 20, 2015, Office Action, dated Jul. 21, 2015.
U.S. Appl. No. 14/033,271, filed Sep. 20, 2013, Office Action, dated Nov. 14, 2016.
U.S. Appl. No. 14/033,271, filed Sep. 20, 2013, Office Action, dated Jul. 21, 2015.
U.S. Appl. No. 14/033,271, filed Sep. 20, 2013, Interview Summary, dated Aug. 18, 2016.
U.S. Appl. No. 14/033,271, filed Sep. 20, 2013, Final Office Action, dated Mar. 15, 2016.
U.S. Appl. No. 14/033,251, filed Sep. 20, 2013, Office Action, dated May 27, 2016.
U.S. Appl. No. 14/033,251, filed Sep. 20, 2013, Interview Summary, dated Aug. 16, 2016.
U.S. Appl. No. 14/033,251, filed Sep. 20, 2013, Final Office Action, dated Dec. 21, 2015.
U.S. Appl. No. 14/033,285, filed Sep. 20, 2013, Office Action, dated Aug. 11, 2016.
Ziauddin, U.S. Appl. No. 15/268,528, filed Sep. 16, 2016, Interiview Summary, dated May 16, 2019.
Ziauddin, U.S. Appl. No. 15/268,528, filed Sep. 16, 2016, Advisory Action, dated May 21, 2019.
Lahorani, U.S. Appl. No. 15/268,519, filed Sep. 16, 2016, Notice of Allowance, dated May 23, 2019.
Ziauddin, U.S. Appl. No. 15/268,528, filed Sep. 16, 2016, Office Action, dated Jul. 26, 2019.
Ziauddin, U.S. Appl. No. 15/268,528, filed Sep. 16, 2016, Interview Summary dated Oct. 31, 2019.
Lahorani, U.S. Appl. No. 15/268,522, filed Sep. 16, 2016, Office Action dated Nov. 20, 2019.
Ziauddin, U.S. Appl. No. 15/268,528, filed Sep. 16, 2016, Notice of Allowance dated Jan. 29, 2020.

* cited by examiner

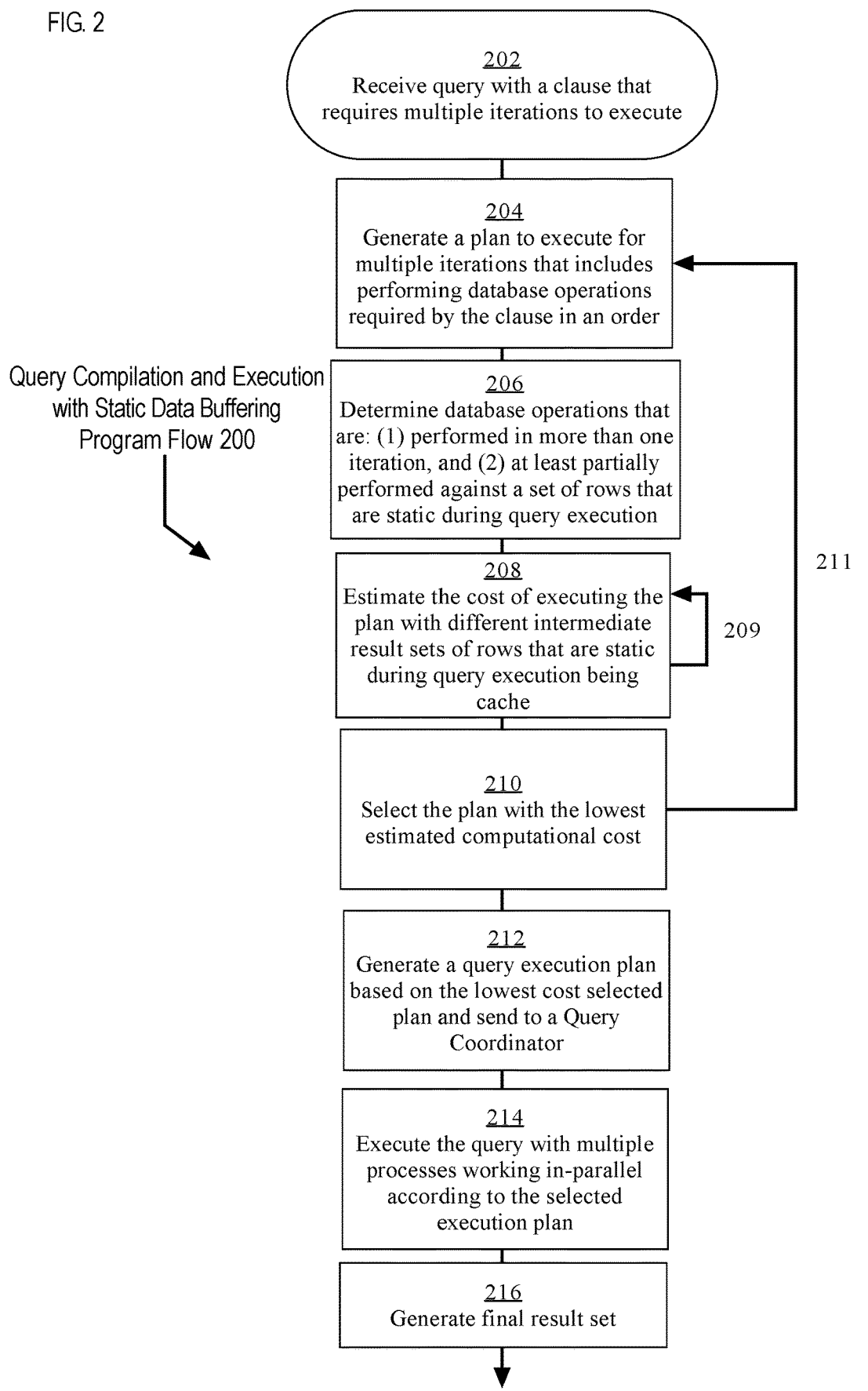

table tnodes_tw 320

| ID | name | password | test |
|---|---|---|---|
| 1 | A | ####### | A@mail.com |
| 2 | B | ####### | B@mail.com |
| 3 | C | ####### | C@mail.com |
| 4 | D | ####### | D@mail.com |
| 5 | E | ####### | E@mail.com |
| 6 | F | ####### | F@mail.com |
| 7 | G | ####### | G@mail.com |
| 8 | H | ####### | H@mail.com |
| 9 | I | ####### | I@mail.com |
| 10 | J | ####### | J@mail.com |
| 11 | K | ####### | K@mail.com |
| 12 | L | ####### | L@mail.com |

FIG. 3B table tedges_tw 340

| EID | FID | TID | Cost |
|---|---|---|---|
| 1 | 1 | 2 | .86 |
| 2 | 1 | 10 | .77 |
| 3 | 2 | 1 | .34 |
| 4 | 2 | 3 | .56 |
| 5 | 2 | 6 | .76 |
| 6 | 2 | 7 | .52 |
| 7 | 3 | 2 | .48 |
| 8 | 3 | 4 | .84 |
| 9 | 3 | 5 | .22 |
| 10 | 4 | 3 | .12 |
| 11 | 5 | 3 | .45 |
| 12 | 6 | 2 | .86 |
| 13 | 7 | 2 | .98 |
| 14 | 7 | 8 | .11 |
| 15 | 7 | 9 | .12 |
| 16 | 8 | 7 | .47 |
| 17 | 9 | 7 | .33 |
| 18 | 10 | 1 | .32 |
| 19 | 10 | 11 | .77 |
| 20 | 11 | 10 | .68 |
| 21 | 11 | 12 | .15 |
| 22 | 12 | 11 | .23 |

FIG. 3C

Example Query 360

```
WITH transitive_closure (fid, fname, tid, tname, iters, cost) AS
(
    SELECT e.fid, n1.name, e.tid, n2.name, 1, 1
        FROM tedges_tw e, tnoes_tw n1, tnodes_tw n2
        WHERE e.fid = n1.id AND e.tid = n2.id AND e.fid < e.tid
    UNION ALL
    SELECT r.fid, r.fname. e.tid, n.name, r.iters+1, r.cost + e.cost
        FROM transitive_closure r, tedges_tw e, tnodes_tw n
        WHERE r.tid = e.fid AND e.tid = n.id AND e.fid < e.tid
)
SELECT *
    FROM transitive_closure;
    ORDER BY 1, 3;
```

INITIALIZATION BRANCH 362

RECURSIVE BRANCH 364

FINALIZATION BRANCH 366

FIG. 3D

Query Execution Plan 480

| ID | Operation | Name |
|---|---|---|
| 0 | SELECT STATEMENT | |
| 1 | UNION ALL (RECURSIVE WITH) | |
| 2 | PX COORDINATOR | |
| 3 | PX SEND QC (RANDOM) | :TQ10003 |
| 4 | MULTI-TABLE INSERT | |
| 5 | DIRECT LOAD INTO | SYS_TEMP_0003 |
| 6 | DIRECT LOAD INTO | SYS_TEMP_0001 |
| 7 | HASH JOIN | |
| 8 | HASH JOIN | |
| 9 | PX RECEIVE | |
| 10 | PX SEND HASH | :TQ10000 |
| 11 | PX BLOCK ITERATOR | |
| 12 | TABLE ACCESS FULL | TNODES_TW |
| 13 | PX RECEIVE | |
| 14 | PX SEND HASH | :TQ10001 |
| 15 | PX BLOCK ITERATOR | |
| 16 | TABLE ACCESS FULL | TEDGES_TW |
| 17 | PX RECEIVE | |
| 18 | PX SEND HASH | :TQ10002 |
| 19 | PX BLOCK ITERATOR | |
| 20 | TABLE ACCESS FULL | TNODES_TW |
| 21 | PX COORDINATOR | |
| 22 | PX SEND QC (RANDOM) | :TQ20004 |
| 23 | MULTI-TABLE INSERT | |
| 24 | DIRECT LOAD INTO | SYS_TEMP_0003 |
| 25 | DIRECT LOAD INTO | SYS_TEMP_0002 |
| 26 | HASH JOIN BUFFERED | |
| 27 | PX RECEIVE | |
| 28 | PX SEND HYBRID HASH | :TQ20002 |
| 29 | PX BLOCK ITERATOR | |
| 30 | TABLE ACCESS FULL | SYS_TEMP_0001 |
| 31 | PX RECEIVE | |
| 32 | PX SEND HYBRID HASH | :TQ20003 |
| 33 | VIEW | |
| 34 | HASH JOIN BUFFERED | |
| 35 | PX RECEIVE | |
| 36 | PX SEND HASH | :TQ20000 |
| 37 | PX BLOCK ITERATOR | |
| 38 | TABLE ACCESS FULL | TNODES_TW |
| 39 | PX RECEIVE | |
| 40 | PX SEND HASH | :TQ20001 |
| 41 | PX BLOCK ITERATOR | |
| 42 | TABLE ACCESS FULL | TEDGES_TW |
| 43 | PX COORDINATOR | |
| 44 | PX SEND QC (ORDER) | :TQ30001 |
| 45 | SORT ORDER BY | |
| 46 | PX RECEIVE | |
| 47 | PX SEND RANGE | :TQ30000 |
| 48 | PX BLOCK ITERATOR | |
| 49 | TABLE ACCESS FULL | SYS_TEMP_0003 |

FIG. 4D

STATIC DATA CACHING FOR QUERIES WITH A CLAUSE THAT REQUIRES MULTIPLE ITERATIONS TO EXECUTE

BENEFIT CLAIM

This application claims the benefit of Provisional Appln. 62/245,957, filed Oct. 23, 2015, the entire contents of which is hereby incorporated by reference as if fully set forth herein, under 35 U.S.C. § 119(e). Portions of the specification may also be supported by Provisional Appln. 62/245,867, Provisional Appln. 62/245,869, and provisional application 62/245,958, all filed Oct. 23, 2015, the entire contents of which are both hereby incorporated by reference as if fully set forth herein, under 35 U.S.C. § 119(e).

FIELD OF THE INVENTION

The present invention relates to data storage and retrieval techniques in a multi-node cluster, and more specifically to caching sets of rows that are static during execution of a query with a clause that requires multiple iterations to execute.

BACKGROUND

Database systems typically store database objects (e.g. tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

A certain type of query is a query with a clause that requires multiple iterations to execute, such as a query with a recursive clause. In a query with a clause that requires multiple iterations to execute, the results from a previous iteration are used to execute the next iteration. In addition, some data inputs are repeatedly used such that they don't change from iteration to iteration. To execute this type of query, a plan is generated regarding the order in which to apply each database operation of the plurality of database operations required by the iterative clause. A cursor stores this plan, and then the plan is executed multiple times—once for each iteration.

Unfortunately, because the end results of a previous iteration are always different, every database operation must be applied for every single iteration. Nothing is cached from the previous iterations except perhaps the end results of the immediately preceding iteration. The computational expense of performing many database operations over and over can monopolize the system resources of a database management system (DBMS).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 is a flow diagram illustrating a program flow of query compilation and query execution of a query with a clause that requires multiple iterations to execute.

FIG. 3B is a table that relates the name, password, and email of a user in the affinity graph shown in FIG. 3A to an ID;

FIG. 3C is a table that records the likelihood that a receiver of a single message will resend that message to another user in affinity graph in FIG. 3A;

FIG. 3D is an example query that may be used to calculate the cost of the transitive closure of the affinity graph in FIG. 3A based on the records in FIG. 3B and FIG. 3C;

FIG. 4D is an example of a selected query execution plan for the query in FIG. 3D using the order of operations described in FIG. 4A based on a lowest estimated cost model.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A query is generally processed by a database management system in two phases: query compilation and query execution. During the compilation phase, the database management system receives a database query, parses the query, and determines an execution plan for executing the query. During query execution a query coordinator manages a set of one or more slave processes to execute the query according to the execution plan generated in the compilation phase.

The compilation phase for a query with a clause that requires multiple iterations includes generating a plan to execute for multiple iterations. Techniques are described herein to identify, in a plan for such a query, sets of rows (e.g., input rows for a database operation, intermediate result sets of a database operation, views, etc.) within that plan that contain static data that is static during execution of the query. Once these static sets of rows are identified, an additional step may be added to the plan to load the static set of rows in a database buffer cache. Then, one or more database operations, from an iteration other than the first iteration, may be performed against the static set of rows. Because the static set of rows are cached in a database buffer cache, performing the one or more database operations against these static set of rows is computationally faster than accessing the same rows by re-computing them from scratch.

In some embodiments, multiple plans may be generated. Each plan either varies the order in which the database operations of the query are executed or varies the order in which intermediate result sets of rows may be cached. In these embodiments, an estimated cost is determined for each plan by summing, for each database operation in the plan, the estimated cost of scanning the rows necessary for a given database operation, the cost of distributing said rows to a plurality of database server instances (or slave processes), and the cost of performing the given database operation.

The estimated cost for each database operation will vary from plan to plan because static sets of rows are cached at different stages in each plan. The plan with the lowest cost plan is then selected as the query execution plan and used during query execution.

System Overview

Figure 1:
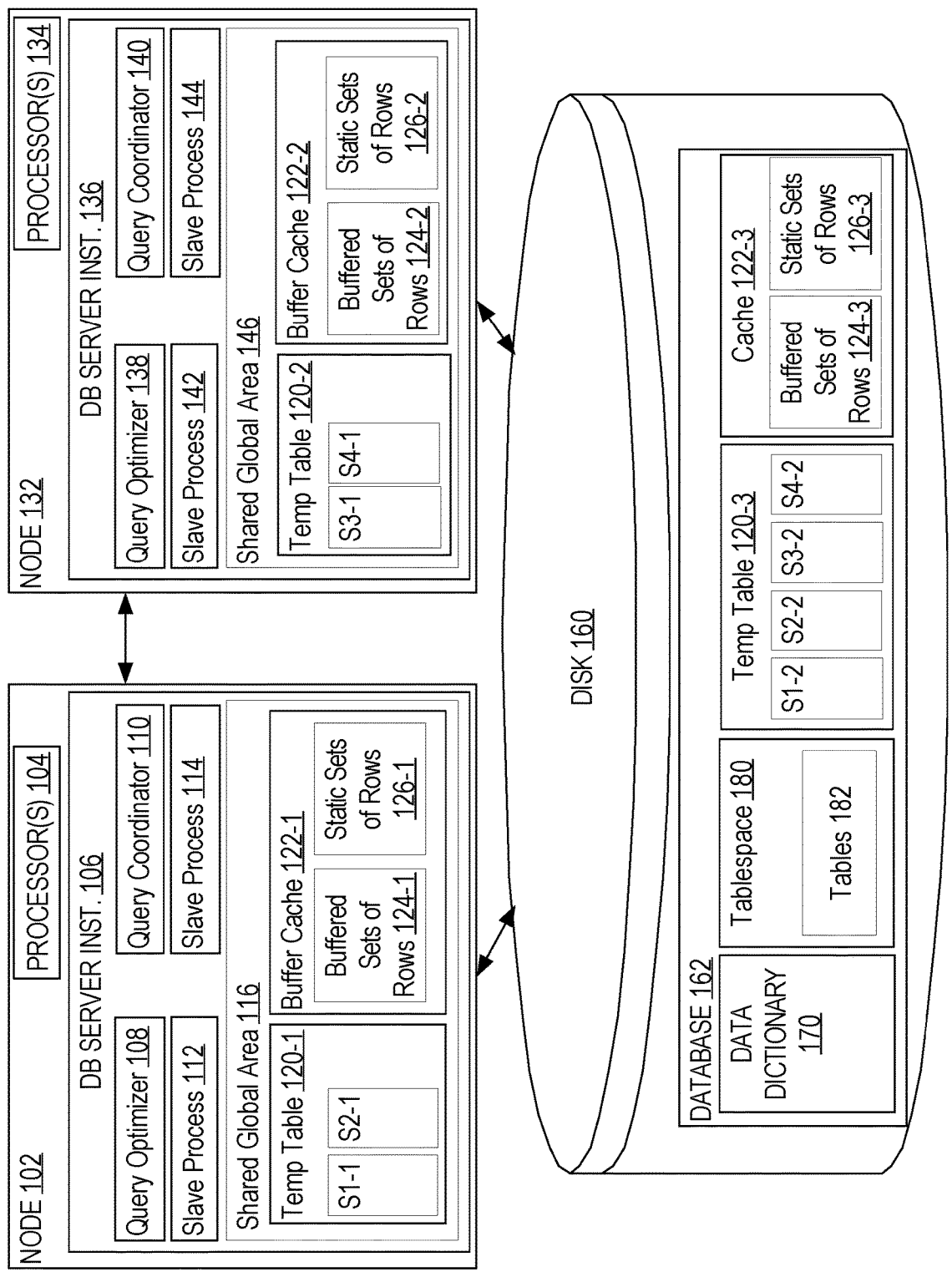
FIG. 1 is a block diagram illustrating an example of a system architecture configured to generate a query execution plan and to execute said query execution plan using static data buffering.

FIG. 1 is a block diagram illustrating an example system architecture of a relational database management system (rDBMS) 100 with two database server computers 102, 132 operatively coupled to shared disk 160 that stores database 162. Each database server computer 102, 132 has processors 104, 134 and volatile memory (not shown) that are used to execute database server instances 106, 136.

For purposes of illustration, the rDBMS 100 is shown as two database server computers 102, 132 executing two database server instances 106, 126 coupled to a database 162 stored in persistent storage (e.g., disk 160). In alternative embodiments, the rDBMS 100 may comprise one or more database server computers each executing one or more database server instances coupled to a database stored on one or more shared persistent storage devices (e.g., hard disks or flash memories). For example, while in the illustrated embodiment database server computer 102 is executing a single database server instance 106, in alternative embodiments a single database server computer may execute three database server instances, wherein each database server computer is operatively coupled to the same shared disk(s).

Database server instances 106, 136 execute database commands that are submitted to database server computer 102, 132 by one or more users or database applications. These users and database applications may be referred to herein as external entities to signify that they are external to the internal programs and structures of the rDBMS 100. An external entity may be connected to the rDBMS 100 through a network in a client-server relationship.

Each database server instance 106, 136 further comprises processes such as a query optimizer 108, 138; a query coordinator 110, 140; and one or more processes that execute database operations in parallel ("slave processes") 112, 114, 142, 144. Each database server instance also comprises local memory referred to as a shared global area (SGA) 116, 146.

During query compilation, a process within a database server (e.g., query optimizer 108 or 138) receives a database query, parses the query, and determines an execution plan for executing the query. The execution plan may be stored in a cursor and sent to a query coordinator. During query execution, a process within a database server (e.g., query coordinator 110 or 140) manages a set of one or more processes (e.g., slave processes 112, 114, 142, 144) to execute database operations of the query execution plan generated by the query optimizer.

A DBMS may execute the execution plan as a distributed operation. Plan operations may be divided into work granules, some of which may be executed in parallel by a plurality of slave processes. A slave process, when reading data, could be referred to as a reader process. A thread, when writing data, could be referred to as a writer process.

Typically, a query coordinator generates work granules and assigns the work granules to slave processes. In some embodiments, rather than the query coordinator generating and assigning work granules to slave processes, slave processes assign their own work granules. Each slave process may determine a work granule to execute and then indicate the next work granule a slave process can execute. For example, when reading from a table, a slave process may determine that a first work granule includes reading a portion of the table and a second work granule includes reading the next portion of the table. The slave process may select and execute the first work granule. Either the slave process or other free slave processes may select and execute the second work granule.

Data Dictionary

Database 162 comprises tablespaces, including tablespace 180, which are files used for storing data for database objects (e.g., tables, temporary tables, indexes, logs, and control files). Metadata regarding these database objects is normally stored in data dictionary 170.

The data dictionary is a central part of data management. For example, in order for a process within a database server instance to access the database, the process performs the following actions:

Any process may accesses the data dictionary 170 to find information about users, schema objects, and storage structures before providing access to a particular table to execute operations caused by a DML statement.

Before providing access to a particular table, a process may modify the data dictionary 170 to execute operations caused by a data definitional language (DDL) statement.

Table Data Structures

Table data is stored in one or more ranges of physical addresses on persistent storage or volatile memory in various physical data structures, which comprise:

data blocks extents segments

A table is composed of one or more segments; segments are composed of extents, and extents are composed of data blocks. The smallest table data structure is referred to as a data block. A data block is an atomic unit of data that a database server may request to read from and write to a storage device that stores table data in, for example, a block-mode storage device. In order to retrieve a row from a storage device, a data block containing the row is read into memory, and the data block is further examined to determine the row's location within the data block.

A data block may be constrained to a discrete number of physical addresses (i.e., a discrete size) for paging purposes. A data block may comprise data items and header metadata for data block specific information such as transaction history of data items within the data block. In a preferred embodiment, the data items correspond to a set of logically contiguous rows organized into physical columns in row-major format. For example, a data block may contain two rows of data items, R1C1, R1C2, R1C3, R2C1, R2C2, R2C3, and metadata regarding said data items in a discrete number of contiguous memory addresses.

The next largest data structure of a table is referred to as an extent. An extent comprises a set of contiguous data blocks (i.e., contiguous within an address space). An extent may also comprise metadata describing the length of the extent, the number of data blocks in the extent, the end address of the extent, or any combination thereof. For example, an extent may comprise two data blocks B1 and B2 and head metadata describing the length of the extent as 2.

The next largest data structure of a table may be referred to as a segment. The "data" of a segment comprises a set of extents. The "header metadata" of a segment may comprise pointer data to the locations of each extent of the segment.

Temporary Tables

In order to execute a query, database management system 100 may create one or more temporary tables (e.g., temporary table 120) to store one or more sets of rows. For example, after receiving a query with clause that requires multiple iterations to execute, DBMS 100 may create a temporary table to store the results of an iteration. For each additional iteration, the results of the previous iteration may be processed (e.g., in a join statement), and then additional results may be appended to the table. Because the temporary table has additional rows added to it during query execution, the set of rows that define the temporary table are referred to herein as "dynamic."

Traditionally, temporary tables are stored in shared persistent storage, but as shown in FIG. 1, a temporary table may also be stored directly in volatile memory, or even distributed across the volatile memories of multiple nodes (e.g. nodes 102, 132) in DBMS 100. These "distributed" temporary tables are processed in-parallel by multiple slave processes (e.g. slave processes 112, 114, 142, 144). In a consumer-producer approach, the slave processes that are local to a particular portion of a temporary table are assigned to "consume" a local portion of the temporary table by scanning a particular set of rows of that table and distributing the scanned rows to other slave processes for "producing" new rows based on a particular database operation. For example:

Slave Process 112 may be assigned to scan and distribute segment S1-1, which is local to slave process 112 being stored in temp table 120-1

Slave Process 114 may be assigned to scan and distribute segment S2-1, which is local to slave process 114 being stored in temp table 120-1

Slave Process 142 may be assigned to scan and distribute segment S3-1, which is local to slave process 142 being stored in temp table 120-2

Slave Process 144 may be assigned to scan and distribute segment S4-1, which is local to slave process 144 being stored in temp table 120-2

Even when a temporary table is optimized to be stored in volatile memory, that temporary table need not be stored entirely in volatile memory. For example, in some cases, the temporary table may exceed the space that has been allotted to it in volatile memory. In such cases, the temporary may spill over to disk 160 as shown in FIG. 1. Processing of the on-disk portion of the temporary table may be managed similar to in-memory portions. For example:

Slave process 112 may be assigned to scan and distribute Segment S1-2, which is stored on shared disk in temp table 120-3

Slave process 114 may be assigned to scan and distribute Segment S2-2, which is stored on shared disk in temp table 120-3

Slave process 142 may be assigned to scan and distribute Segment S3-2, which is stored on shared disk in temp table 120-3

Slave process 144 may be assigned to scan and distribute Segment S4-2, which is stored on shared disk in temp table 120-3

Database Buffer Cache

In order to execute a query, database management system 100 may create one or more database buffer caches (e.g., buffer cache 122) to store one or more sets of rows that are being operated against. These buffer caches contain database rows similar to how the data is stored in tables in database 162. Data items are organized by rows and columns that are grouped into blocks. Groups of blocks may be stored as extents, and groups of extents may be stored as segments. Buffered data blocks may be quicker to access because they are stored locally in volatile memory instead of requiring a disk access.

In an embodiment, the buffer cache need not be written to disk, but because volatile memory space is limited, if a particular set of rows exceeds the size allotted for a particular in-memory buffer cache, then the additional data is written to disk. Thus, in the case where an intermediate result set of rows is larger than the memory address space allocated for that buffer cache, the set of rows are partially stored in volatile memory (e.g. buffer cache 122-1, 122-2) and partially stored on shared disk (buffer cache 122-3).

A database buffer cache may include header metadata that further describes rows, blocks, or segments stored in the buffer cache. For example, the buffer cache may store a system change number ("SCN") in the header as a timestamp of the cached data for consistency purposes. The header metadata may also indicate that (1) the database buffer cache contains data that is more current than the database itself (i.e., dirty), (2) the database buffer cache contains data that is also in another node's buffer cache, and (3) the database buffer cache contains data that can be written to disk without overwriting a later version of a block stored in another node's buffer cache.

Buffered Set of Rows

After receiving a query that has two or more database operations, the output (i.e. a first intermediate result set of rows) of a first database operation may be used as the input for a second database operation. If a received query includes more than two database operations, then the output (i.e. a second intermediate result set of rows) of the second database operation may be used as the input for a third database operation, and so on. Because the intermediate result sets of rows produced for some database operations are immediately consumed for processing in the next database based operation, storing the data back to disk for each database operation may waste valuable computational resources. Thus, a buffer cache (e.g., buffer cache 122) may be used to buffer sets of rows (e.g., buffered sets of rows 124) that are used for the next database operation.

Static Data Buffering

A certain type of query is a query with an iterative clause, such as a query with a recursive clause. To execute a query with an iterative clause, a query optimizer determines a query execution plan that includes an order of database operations required by the query, and those operations are applied in that order for multiple iterations. Some sets of rows resulting from a database operation may be buffered for use as input for the immediately following database operation. Once those intermediate result rows are used as input, they are immediately discarded (i.e., overwritten). In an embodiment, some sets of intermediate result rows are identified as used in multiple iterations, so they are cached and used as input for database operations in multiple iterations without overwriting them. The process of storing a set of rows for use in multiple iterations is referred to herein as "static data buffering."

In static data buffering, inputs and intermediate result sets that contain static data during query execution are identified during query compilation, and a portion of buffer cache 122 is assigned to store these static sets of rows 126-1, 126-2, 126-3). Rather than overwriting these rows after they are used for the first time, these sets of rows are stored in volatile memory or in persistent storage for use as inputs to the same database operation for multiple iterations.

Consistent Read Queries

Database server instances 106, 136 generally use the most current data stored in database 162 to respond to queries for information. While executing a first query, a second query may commit a change that creates or updates data items within a database. In order to provide the same information for the duration of the first query's execution, each query is associated with a particular SCN or timestamp. The timestamp or SCN indicates a transactional state of the database at the time of the query. When a query SCN matches or is before the SCN of a data block in a buffer cache 122, a database server instance may use the buffer cache 122 to retrieve data for the query rather than the database 162. Blocks stored in a buffer cache typically contain transaction data for previous transactions, so such a block may be rolled back to a particular query SCN.

If a query SCN is later than the SCN of a block in a local buffer cache, a database server instance must retrieve the rows of that block from a source outside of the local buffer cache. One such source is the persistently stored database 162.

When executing a query with a clause that requires multiple iterations, each iteration must be read against data that is transactionally consistent. Changes made by database operations for a particular query are seen by future database operations of that query, but those changes are not seen by other queries until the transaction is commited. Thus, a set of rows 126 stored using static data buffering may be loaded into buffer cache 122 and read repeatedly without a worry that those rows will become invalid during the course of query execution. The total cost of rolling back data blocks in order to perform consistent reads may be reduced by buffering a static set of rows at a particular SCN or timestamp for the query.

Slave Process Locking

In some embodiments, the slave processes that load a set of rows into a buffer cache are given ownership affinity over that set of rows in the buffer cache. For static data buffering, this means that the slave processes that loaded those rows into the buffer cache must be available for each time that those rows are needed during query execution. To prevent those slave processes from being accessed by another query coordinator for processing other queries, a set of slave processes are locked from executing other queries while executing a query that has static data buffering employed as an optimization.

Query Compilation

Based on the database operations required by a received query, a query optimizer (e.g., query optimizer 108 or 138) performs a cost analysis during query compilation to determine which sets of intermediate result rows should be buffered as buffered sets of rows 124, and which sets of rows should be buffered as static sets of rows 126. Once the query optimizer determines the most efficient manner to buffer data, the query optimizer generates instructions that specify the order in which to execute the database operations required by the query, and at which points the static data should be buffered.

Determining an execution plan may entail determining an optimal execution plan of a plurality of different execution plans, based on, for example, database statistics. These statistics are used to estimate the cost of performing each database operation in an execution plan based on metrics regarding the distribution of data items in the table(s) that the operations are being performed against and the cost of performing previous operations that are similar or the same as the operations being performed.

Some database operations must occur before other database operations. For example, some database operations required to generate a first iteration of results must be performed before other database operations required to generate a second iteration of results. However, in other cases, there is no need to preserve the order of database operations as received in the query. Effective query compilation involves determining that a first database operation may be performed before a second database operation, which significantly reduces the work required to get a result.

An additional determination made during query compilation is the degree of parallelism possible for the query. Parallelism is an effective way to improve the performance of an SQL statement. During the parallel execution of the statement, every SQL operation in the execution plan is divided into work granules, each assigned to a different slave process (e.g., slave processes 112, 114, 142, 144). Work granules are generally divided by data items in a table based on the stored statistics of the range of data items in the table. Data produced by a set of slave processes executing one operation are distributed to the set of processes executing the next operation in the plan. The number of slave processes assigned to an SQL operation is called the degree of parallelism (DOP). The DOP parallelism may be determined based on the number of slave processes available given system resources and the cost of performing the database operations that may be executed serially versus in-parallel.

Cost Analysis

According to one embodiment, a query optimizer uses an estimated cost model to generate and select plans optimized in a manner that accounts for the use of different optimization techniques. In general, the estimated cost model may be used by the query optimizer, for example, to determine, for each given database operation in a possible execution plan (1) the estimated cost of a table scan (i.e., a producer step); (2) the estimated cost of distributing the data from each respective process that performed the scan to each respective process that receives the data as input; and (3) the estimated cost of performing the work required by the given database operation (i.e., the consumer step). The sum of all of the estimated costs for each database operation in a possible plan is compared to the cost of alternative plans (such as plans that change the order of database operations or use a particular optimization technique) to determine the optimal plan.

According to one embodiment, the estimated cost model includes both CPU costing and I/O costing for each estimated cost. Thus, a table scan may include different estimated costs if the data required for the scan is stored on disk or buffered in volatile memory.

Many estimated costs may be minimized to only one cost rather than a multiplicative of that cost for the number iterations by caching data. For example, costs associated with performing a consistent read costs associated with projecting by excluding unnecessary columns from input rows cost of performing a database operation (filter predicate, join)

Many estimated costs may also change based on how data is cached. For example, costs of scanning a table versus costs of scanning data from a buffer cache cost of distributing data stored in a buffer cache versus distributing the data on the fly as it is being processed In addition saving computational resources by saving on the time it takes to compute some database operations by simply storing the data, caching data may also save on the total amount of data processed. For example, before the data blocks are buffered, projection may be performed to select only the useful columns and filter predicates may be applied to select only the useful rows. Thus, only a smaller subset of buffered data items need to be scanned as input for future database operations. Applying filter predicates to weed out rows that will never be used may also include other optimization techniques such as partition pruning. The costs associated with these techniques are also reduced to a one time rather than a multiplicative cost by caching.

Cost Analysis with Static Data Buffering Overview

When a plan is generated, the cost associated with performing scanning, distributing, and computing of each database operation is estimated. Then, these individual costs are added together to get the total cost of the plan. The optimization of static data buffering a set of rows may significantly reduce the estimated cost of performing one or more database operations in the plan because filtering, projection, computation, and distribution only need to be performed once. The database management system employs a cost analysis strategy to model the cost of multiple plans that use static data buffering at different points to determine the lowest cost execution plan.

When multiple static data inputs exist, cost estimation helps in determining how to group (or not group) static data before it is buffered. The grouping of static data interplays with different possible sequences of database operations. Thus, the query optimizer needs to be aware of costing savings due to static data grouping and buffering in addition to the cost savings of varying the sequence of data operations that facilitate static data grouping. For example, a particular sequence of database operations may enable maximal static data grouping (thus maximal cost savings) but this particular sequence of operations may be much more costly compared to another sequence of operations that is much less costly even though it does not enable grouping of static data.

FIG. 2 is a flow diagram illustrating a program flow 200 of query compilation and query execution with static data buffering (i.e., buffering a static set of rows during query execution). At step 202, a database management system receives a query with a clause that requires multiple iterations to execute (e.g., recursive WITH, CONNECT BY, FOR LOOP, WHILE, etc.). A query optimizer then generates a plan to execute the clause at step 204. The plan is generated to be executed for multiple iterations, which includes performing database operations required by the clause in a specified order repeatedly.

At step 206, a process of the database management system (e.g., the query optimizer) determines which database operations are (1) performed in more than one iteration, and (2) at least partially performed against a set of rows that are static during execution of the query. At step 208, a process of the database management system (e.g., the query optimizer) estimates the cost of executing the plan by caching an intermediate result set of one of the database operations determined step 206. As shown in by the looping back arrow 209, this step may be repeated multiple times for different intermediate result sets of rows that are static during query execution. At step 210, a process of the DBMS (e.g., the query optimizer) selects the plan with the lowest cost of all of the different cached intermediate result sets estimated at step 209.

As indicated by the looping back arrow 211, the entire process may be repeated again with a different plan. The different plan has a different order of operations than any of the previous plans. As such, different buffer points may be determined at step 206, and different estimated costs are generated at step 208. At step 210, the plan with the lowest cost between the current plan and the previously executed plan is selected.

Once the lowest cost plan is determined after repeating loop 211 for multiple different plans, and repeating loop 209 for multiple different buffer points, a process of the DBMS (e.g., the query optimizer) generates a query execution plan based on the lowest cost selected plan and sends this plan to a process of the DBMS (e.g., the query coordinator) at step 212.

At step 214, a process of the DBMS (e.g., the query coordinator) executes the query according to the selected plan. In order to execute the plan, the query coordinator may lock multiple slave processes to execute the query execution plan. The query execution plan may include an optimized number of slave processes to execute the query, but the query coordinator actually selects these slave processes. These slave processes may be spontaneously generated or pulled from an existing pool according to how the database management system is configured and available system resources. After each iteration of the clause has been executed, the slave processes may be used to generate a final result at step 216.

Example Use Case—Graph Problems

Queries with recursive clauses can be very useful in processing hierarchal relationships and graphical relationships. For example, a collection of entities may be related to one another through "edges," and one can calculate the degrees of separation between two entities through the number of edges connecting those two entities. Each edge may be associated with a cost. A problem known generally as the travelling salesman problem is to calculate the minimum cost of travelling between two entities through multiple intermediate entities.

Another interesting problem in processing relationships is referred to as transitive closure. Informally, the transitive closure for a set of entities is the set of all entities that can be accessed from any starting entity. Solving for a transitive closure involves determining the first degree relationships of a particular entity, and then determining the next degree relationships from the results achieved in the previous determination. The problem is solved when the Nth degree relationships have been determined and no additional relationships exist. Transitive closures can be used to model travelling from a starting airport to other airports. Transitive closures can also be used to model how a message is sent to a group of followers, and from there the same message is resent by those followers to their followers and so on to the Nth degree.

Implementation Example

Figure 3A:
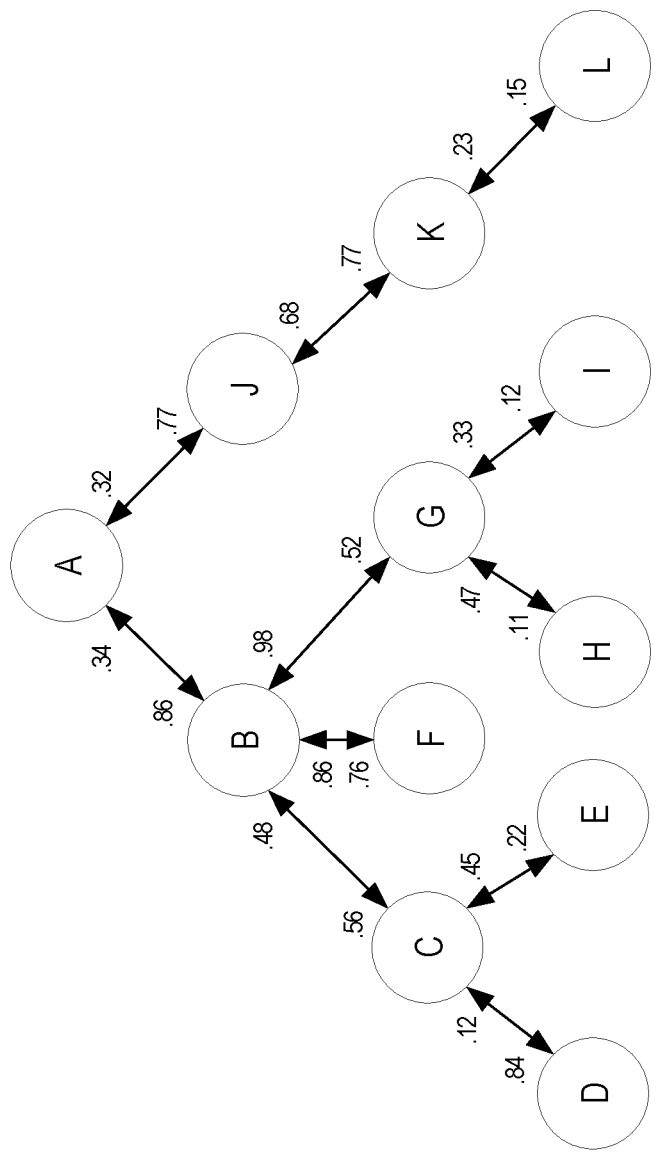
FIG. 3A is an affinity graph of users relating to other users (e.g., followers) through degrees of separation between one user and any other user.

FIG. 3A is an affinity graph of users relating to other users (e.g., followers) through degrees of separation between one user and any other user. In FIG. 3A, each entity is represented by a user identification "id" integer, and the relationships between entities are represented by two directional arrows. A cost is shown next to the head of each arrow, representing the probability that a particular message will be resent after receiving the particular message from another user. The cost of sending an initial message is always one because there is a one hundred percent chance that the initial message is sent.

A record may be stored in a database of each relationship presented in the affinity graph 300. For example, FIG. 3B is a table of records that track the users in affinity graph 300. Although each user has a username such as "A" or "B", each user is also given a user id or simply an "ID". This allows each user to be a distinct entity within the database. Table 340 may be one of many tables in tables 182 shown in FIG. 1.

FIG. 3C is a table of records that track the probability that a single message will be resent from a particular "id" to a particular "id" in affinity graph 3A. Table 340 comprises an "fid" column which refers to the user identifier of who the message was from, a "tid" column which refers to user identifier of who the message is to, and a "cost" column which refers to a probability that a particular message will be resent after receiving the particular message. Table 340 may be one of many tables in tables 182 shown in FIG. 1. The records of table 340 can be related to the records of table 320 using a JOIN predicate.

In the above example, a message may be sent to a set of one or more followers of a particular user. Then the message is resent to followers of the followers, and finally the message is sent to followers of the second degree followers. We may solve for the transitive closure of the set of entities with IDs 1-12 using a query with a recursive clause. The query should traverse the edges described in table 350 to determine 1st degree relationships, 2nd degree relationships, and so on. FIG. 3D is an example query that may be used to calculate the transitive closure of the affinity graph in FIG. 3A based on the records in FIG. 3B and FIG. 3C.

Query 360 may be broken into three branches. Execution of each branch may be performed in-series, but multiple slave processes may be used to execute database operations required by any particular branch in-parallel. Initialization branch 362 is used to create a first iteration of results in the temporary table 120. Recursive branch 364 is then used to generate additional iterations using records from the previous iteration to generate results for each current iteration. Once database operations required by recursive branch 364 have ceased because an end condition has been met, database operations required by finalization branch 366 may be performed against the entire temporary table that was generated by the UNION ALL of initialization branch 362 and recursive branch 364.

A database server instance (e.g., DB server instance 106) may receive query 360 as presented in FIG. 3D, which traverses the graph 300 represented using tables 320, 340 and outputs the cost of traversing the entities in the graph.

Static Data Grouping and Buffering

Given the query in FIG. 3D, a query optimizer could perform a cost analysis of left-deep joins and right-deep joins in various orders. For example, in a hash join, each input database object can be defined as a "build" table or a "probe" table. The build table is used to define how data is hashed among multiple slave processes, and rows from the probe table are compared against the hashed build table. In a left-deep join, the left most input in the query is defined as the build table, and the next input is defined as the probe table. For example, the following orders may be explored for left-deep joins in query 360:

1) (temporary_table)⋈(tedges_tw)⋈tnodes_tw
2) (tedges_tw)⋈(temporary_table)⋈tnodes_tw
3) (tedges_tw)⋈(tnodes_tw)⋈temporary_table
4) (tnodes_tw)⋈(tedges_tw)⋈temporary_table Additionally, the query optimizer may explore the following right-deep joins:

5) temporary_table⋈(tedges_tw⋈tnodes_tw)
6) temporary_table⋈(tnodes_tw⋈tedges_tw)

Where ⋈ represents a join and "(" ")" represent an operation being performed before another operation.

The variations in the order of join operations may cause different types of join methods to be used for each join. For example, the left most table may make for a cost efficient build table for a hash join in some situations, but if that table is swapped with another table, the new left most table may make for a more cost efficient sort-merge join because the new left most table is indexed. A cost analysis model may be applied to each plan described above in order to determine the lowest estimated cost plan.

Assume query optimizer 108 starts with the sixth (6) join operation order. This plan may be effective once query optimizer 108 identifies that table tnodes_tw 320 is a static input set of rows and table tedges_tw 340 is also static input set of rows. Because both of the inputs contain static data, the output of a join between the two tables will also contain a static set of rows. Grouping multiple static input sets of rows together may be referred to herein as "static data grouping." Query optimizer 108 may test a buffer point for the set of rows produced by this join operation by identifying the static set of rows furthest up the chain database operations that only contain static input sets of rows.

Figure 4A:
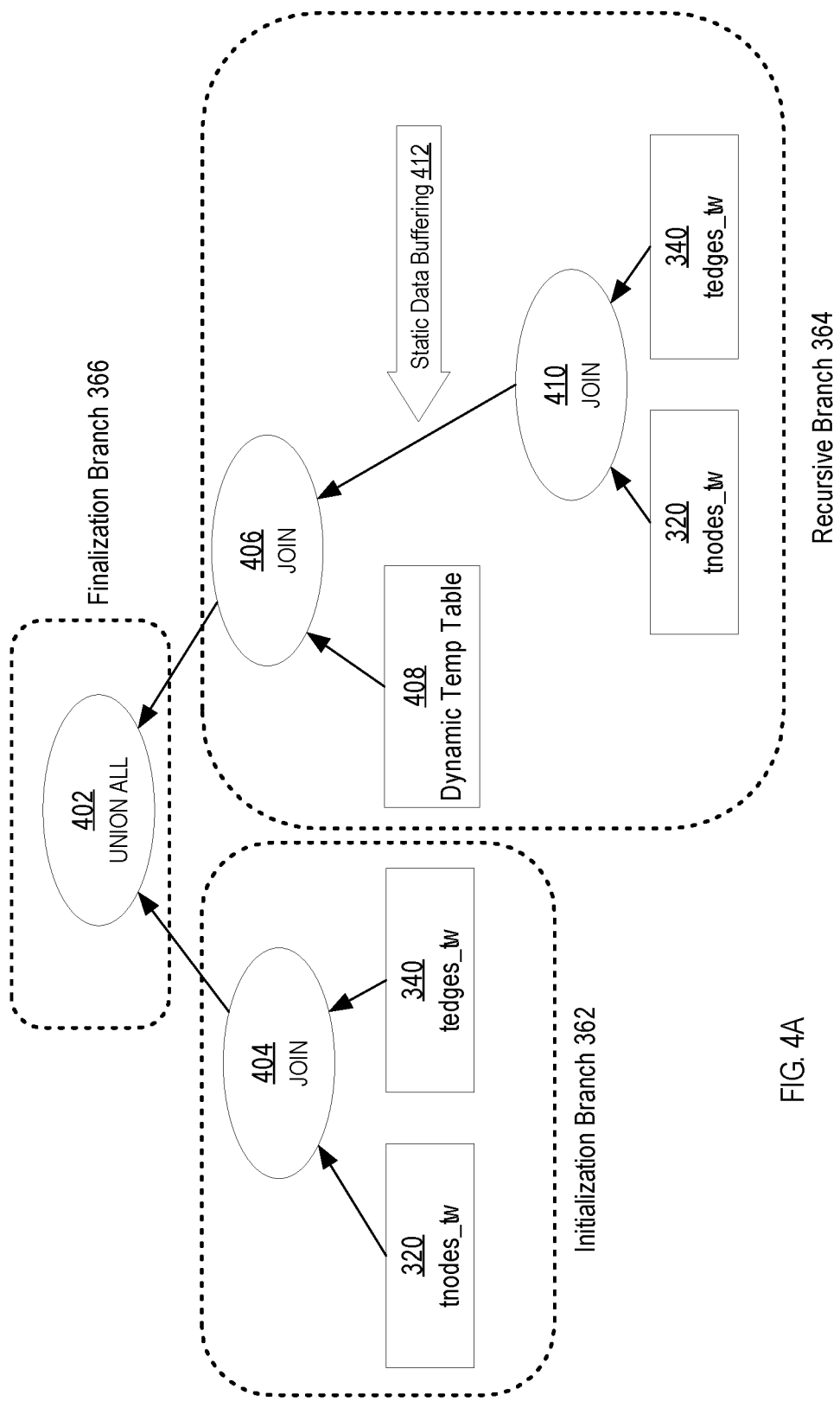
FIG. 4A is a block diagram illustrating a possible query execution plan for the query depicted in FIG. 3D that includes static data grouping and static data buffering.

FIG. 4A illustrates a possible query execution plan that employs static data grouping. Comparing the execution plan to query 360 in FIG. 3D, the execution has a portion associated with the initialization branch 362, a portion associated with the recursive branch 364, and a portion associated with the finalization branch 366. The plan starts with a join operation 404 between table tnodes_tw 320 and table tedges_tw 340 in the initialization branch 362. The results of that initial join 404 may be used to start the dynamic temporary table 408.

Next, a join operation 410 is performed between tnodes_tw 320 and table tedges_tw 340. The results of that join may be buffered using static data buffering at buffer point 412. Then the dynamic temp table 408 is joined with the static set of rows at buffer point 412 in join operation 406. The results of join operation 406 may be added to temporary table 408 and the recursive branch 364 may be repeated for any number of operations. Once the recursive branch is complete, the union all operation 402 may be performed to get the SELECT * results for the finalization branch 366.

Using this plan, the query optimizer may determine an estimated cost. The estimated cost may be stored as the "lowest cost plan." Then multiple other plans can be estimated and compared against the lowest cost plan. If a compared plan has a lower cost than the current lowest cost plan, then it replaces the current lowest cost plan as the lowest cost plan.

For example, in FIG. 4A, after the initial join operation 410 is performed in the first iteration of the recursive branch 364, that operation need not be performed in any additional iterations because the static set of rows for that join operation 410 are buffered at buffer point 412. The cost of scanning the tables 320, 340, distributing the data, and performing the join operation 410 is computed for the first iteration, and then this additional cost is eliminated for each additional iteration. Thus, the plan in FIG. 4A with static data buffering 412 included would be a lower cost than the current lowest cost plan of performing the same plan without static data buffering.

Buffer Point Enumeration

Grouping the static data as shown in the plan in FIG. 4A allows for saving some computational resources. However, if the join is a many-to-many join of two large tables, storing this data may result in a very large set of rows in the buffer cache. In some situations, it may be more desirable to simply store the static input set of rows and compute the intermediate results on the fly. Comparing multiple buffer points may be referred to herein as buffer point enumeration.

Figure 4B:
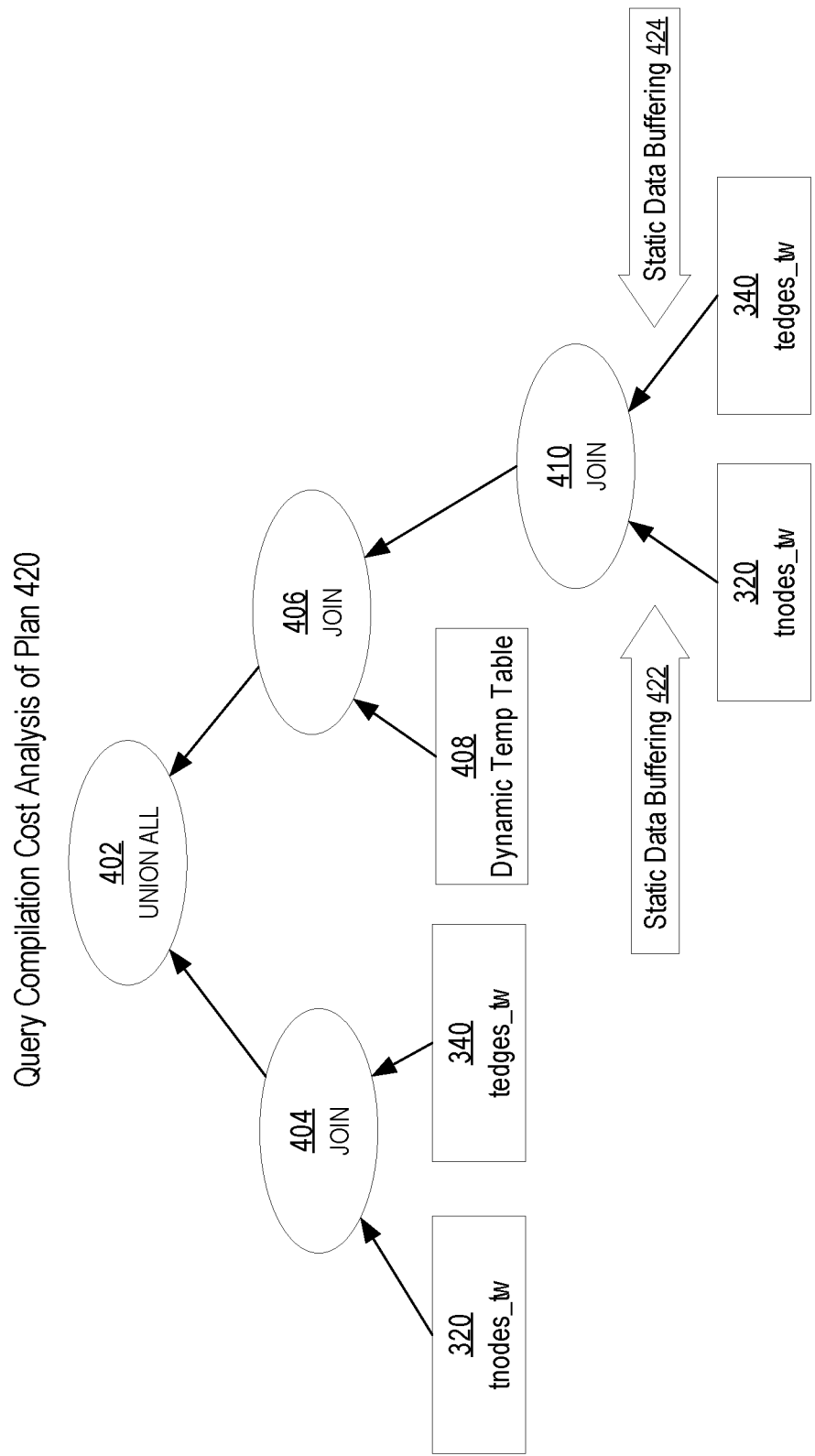
FIG. 4B is a block diagram illustrating the same query execution plan as depicted in 4A but with different static data buffering points for cost analysis purposes.

FIG. 4B is a block diagram illustrating static data buffering at point 424 and point 426 of a static set of rows from input tables tnodes_tw 320 and tedges_tw 340, respectively. Buffering this data may reduce the cost associated with a disk access for each iteration.

In addition, buffering only the input set of rows may provide cost benefits to computation because of the reduced size of the data that is accessed in future iterations. For example, before the static set of input rows are buffered, additional operations may be performed such as rolling the data blocks forward or backward for a consistent read, projecting by excluding unnecessary columns, and applying any filter predicates. Thus, the buffered data is quicker to access because it is cached in volatile memory, and it is easier to process for join 410 because all of the pre-processing has already been complete.

The query optimizer performs a cost analysis of plan 420 and compares that cost to the estimated cost of plan 400. In this buffer point enumeration, the costs will be different because that plans contain different buffer points (static data buffering at 412 in FIG. 4A versus static data buffering at points 422, 424 in FIG. 4B). After comparing, the lowest cost plan may be selected as the current plan for additional plan comparisons.

Performing Cost Analysis of Additional Plans

Considering the cost of multiple join orders may be referred to herein as "join enumeration." In some embodiments, a combination of two or more database operations are enumerated (e.g., joins, filters, aggregates, sorts, inserts, delete, updates, etc.). Such embodiments are referred to as database operation enumeration.

The cost of joining two tables containing static data may be significantly reduced by grouping the operations performed on static data as shown in the plans in FIG. 4A and FIG. 4B. However, the query optimizer still performs a cost analysis of the other plans to determine a plan with the lowest estimated cost. With different sets of rows being joined in different orders, query optimizer 108 may determine different join methods are necessary (between, for example, hash joins, merge-sort joins, and nested loop joins) for each join operation. Note that a different join method may also be used depending on whether a table is indexed and the amount of data in each table. The total cost of each plan may be less or more than the cost of the "lowest cost plan." Any plan with a cost lower than the current lowest cost plan replaces the current lowest cost plan as the lowest cost plan.

Figure 4C:
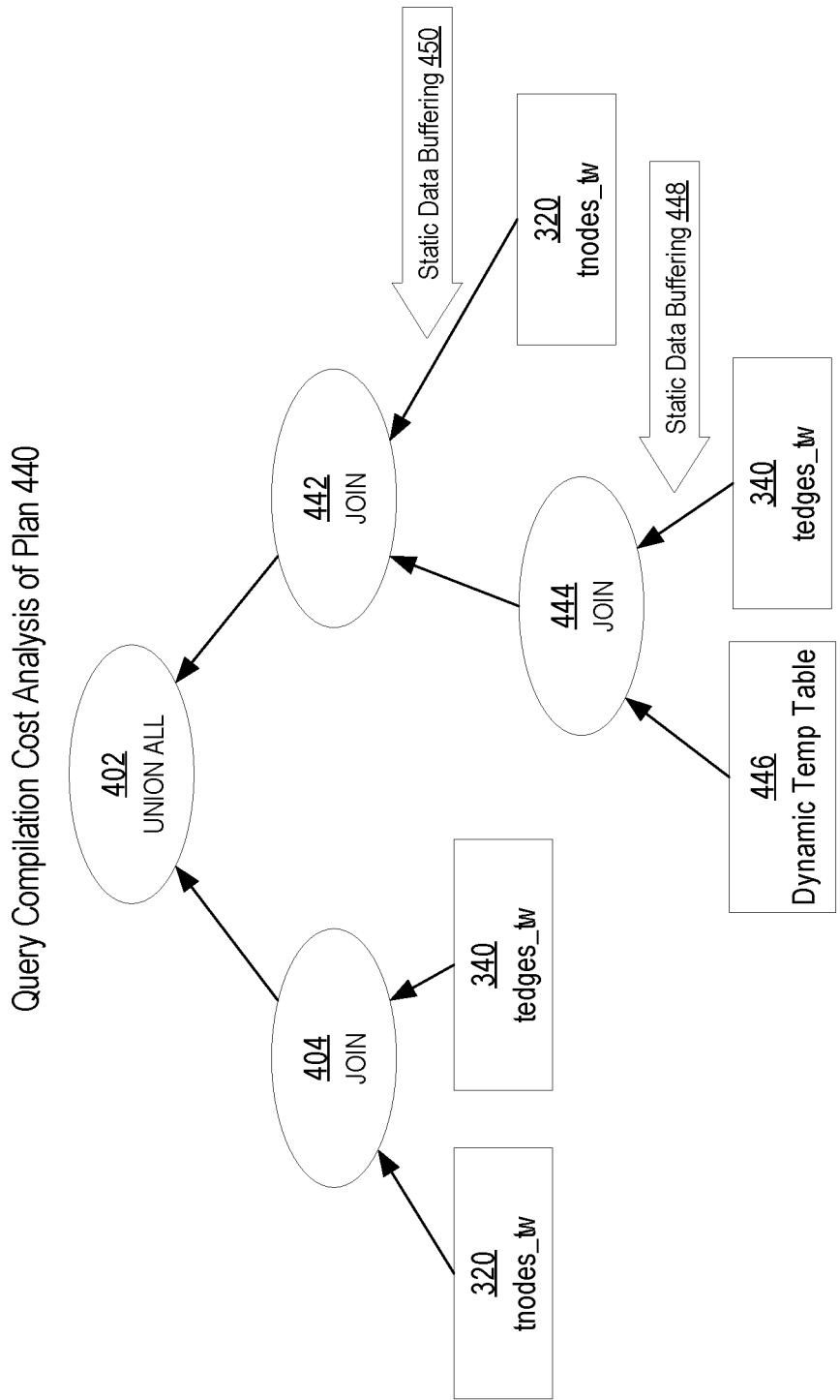
FIG. 4C is a block diagram illustrating a different possible query execution plan than the plan depicted in FIG. 4A and FIG. 4B that does not include static data grouping, but still includes static data buffering of input data.

FIG. 4C is a block diagram illustrating a different possible query execution plan than the plan depicted in FIG. 4A and FIG. 4B that does not include static data grouping, but still includes static data buffering of input data. As can be seen the join operation 404 performed for the initialization branch is the same, but the join operations 442, 444 for this plan 440 are different. In this plan, the join operation 404 in the initialization branch 362 is first executed, and the results are added to the temporary table 446. Then, in the recursive branch 364, the temporary table 446 is joined with the tedges_tw table first in join operation 444. Then the results of that join operation are used in join operation 442. Because one of the input tables 446 of the join operation 444 is dynamic, the results will also be dynamic. Thus, for this query execution plan, static data buffering may only be analyzed using the cost analysis model at points 448, 450. Both of the inputs table 340 and table 320 are static inputs, so buffer points 448, 450 could lower the cost estimation for these plans.

Example Selected Execution Plan

After cycling through a set of the possible execution plans, a lowest estimated cost execution plan is created and stored in a cursor that is sent to the query coordinator. An example of such an execution plan is shown in FIG. 4D.

FIG. 4D is an example of a selected query execution plan for the query in FIG. 3D using the order of operations described in FIG. 4A based on a lowest estimated cost model. In this plan, plan steps 2 to 20 correspond to the initialization branch 362 which is a left-deep plan sub-tree, and plan steps 21 to 42 correspond to the recursive branch 364 which is a right-deep plan sub-tree forced via the use of non-merged view. The data grouping of static data is shown by VIEW at plan step 33. Notice HASH JOIN BUFFERED at plan step 26 which indicates the buffering of the view data computed by joining tnodes_tw and tedges_tw tables. The HASH JOIN BUFFERED at plan step 34 is due to the 2-slave process execution model. Thus, the buffered data at step 34 is only buffered for use as input in the next database operation.

Executing According the Query Execution Plan

Once the query optimizer has determined a suitable query execution plan, the query optimizer send the query execution plan to the query coordinator. The query coordinator then divides each step of the execution plan into work granules and assigns the work granules to one or more slave processes.

During query execution, a temporary table is created, and the set of rows that define the temporary table dynamically expands with each iteration. During query execution, another set of rows, that are specified by the query execution plan as static during query execution are loaded into a database buffer cache after they are processed in the first iteration. Rather than computing the static set of rows from scratch, the DBMS uses the static set of rows in the buffer cache to perform operations specified in the query execution plan for each additional iteration.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
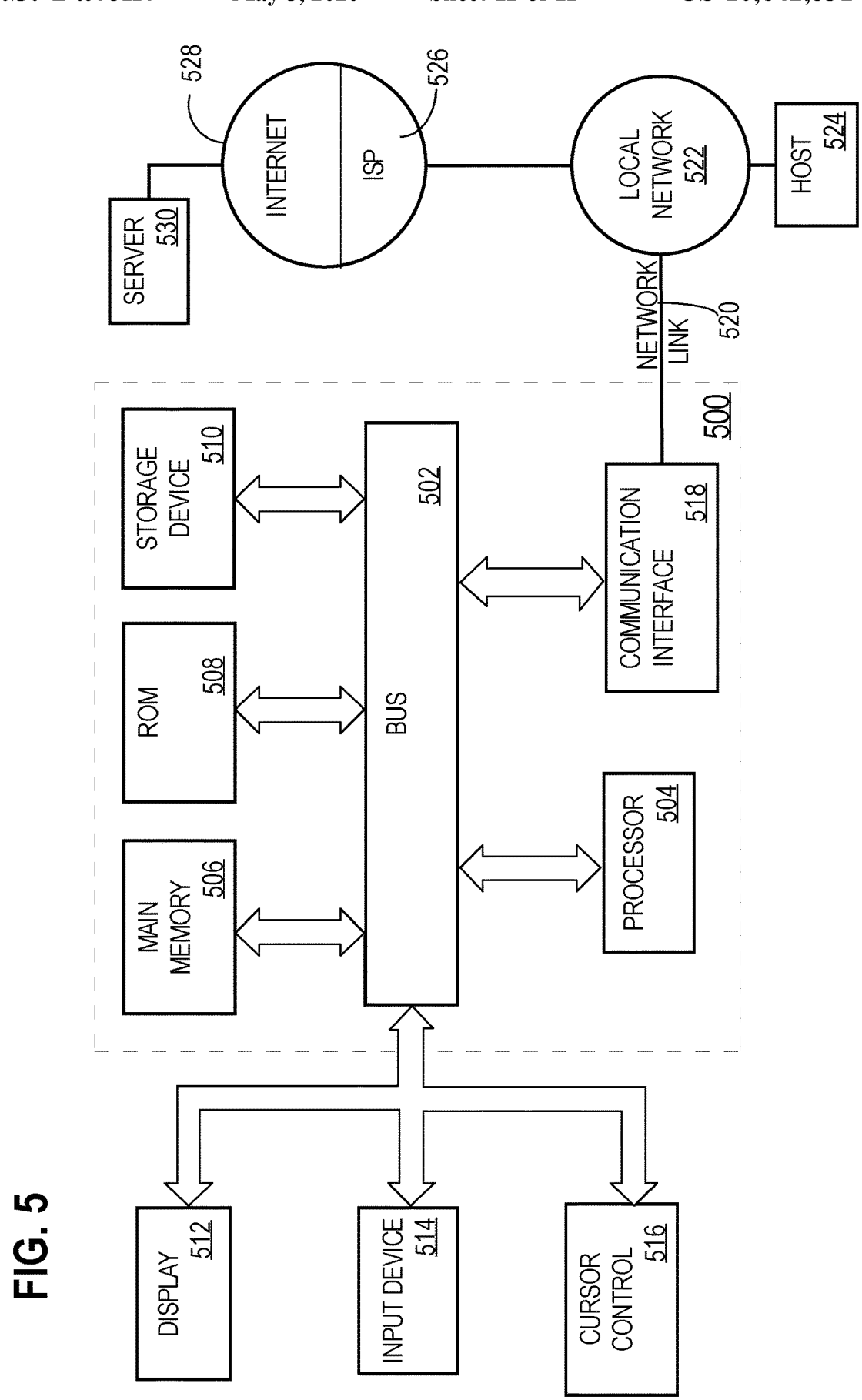
FIG. 5 is a block diagram illustrating a computer system that may be used to implement the techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a query with an iterative clause that requires multiple iterations to execute;
   during compilation of the query, determining, based on the query, a database operation that is:
      performed in more than one iteration of executing the iterative clause, and
      at least partially performed against a static set of rows, said static set of rows being static during execution of the query;
   while executing the query,
      loading said static set of rows into a database buffer cache; and
      performing the database operation in a plurality of iterations, wherein said database operation is performed against the static set of rows loaded into the database buffer cache in an iteration of said plurality of iterations other than a first iteration of said plurality of operations.

2. The method of claim 1, further comprising:
   projecting one or more columns from a particular static set of rows from a database object that is used as input for a database operation in the query; and
   after said projecting one or more columns, using a static set of rows resulting from said projecting one or more columns as the static set of rows to load into the database buffer cache.

3. The method of claim 1, further comprising:
   applying one or more filter predicates to a particular static set of rows from a database object that is used as input for a database operation in the query; and
   after applying the one or more filter predicates, using a static set of rows resulting from said applying one or more filter predicates as the static set of rows to load into the database buffer cache.

4. The method of claim 1, further comprising:
   applying a join operation to a first static set of rows from a first database object and a second static set of rows from a second database object; and
   after applying the join operation, using a static set of rows resulting from said applying the join operation as the static set of rows to load into the database buffer cache.

5. The method of claim 1, further comprising: prior to the executing the clause that requires multiple iterations to execute,
   generating a plan to execute the clause that includes:
      performing a first database operation that produces a first static set of rows; and
      after performing the first database operation, using the first static set of rows as input to perform a second database operation that produces a second static set of rows;
      estimating a first computational cost of executing the plan by buffering the first static set of rows;
      estimating a second computational cost of executing the plan by buffering the second static set of rows; and
      generating a query execution plan based on a lowest estimated computational cost of the first computational cost and the second computational cost.

6. The method of claim 5, further comprising: generating a plurality of query execution plans that vary an order in which the first and second database operations are executed.

7. The method of claim 1, wherein executing the query is performed by a plurality of database server instances; wherein each database server instance of the plurality of database server instances has a respective database buffer cache of a plurality of database buffer caches; wherein the method further comprises distributing the static set of rows across the plurality of database buffer caches.

8. The method of claim 7, wherein each database server instance of the plurality of database server instances includes at least one respective slave process to execute the query; wherein the method further comprises locking the respective slave processes from executing other queries while executing the query.

9. One or more non-transitory computer-readable media storing one or more sequences of instructions which, when executed by one or more processors, cause:
   receiving a query with an iterative clause that requires multiple iterations to execute;
   during compilation of the query, determining, based on the query, a database operation that is:
      performed in more than one iteration of executing the iterative clause, and
      at least partially performed against a static set of rows, said static set of rows being static during execution of the query;
   while executing the query,
      loading said static set of rows into a database buffer cache; and
      performing the database operation in a plurality of iterations, wherein said database operation is performed against the static set of rows loaded into the database buffer cache in an iteration of said plurality of iterations other than a first iteration of said plurality of operations.

10. The one or more non-transitory computer-readable media of claim 9, storing instructions which, when executed by the one or more processors, further cause:
    applying one or more filter predicates to a particular static set of rows from a database object that is used as input for a database operation in the query; and
    after applying the one or more filter predicates, using a static set of rows resulting from said applying one or more filter predicates as the static set of rows to load into the database buffer cache.

11. The one or more non-transitory computer-readable media of claim 9, storing instructions which, when executed by the one or more processors, further cause:
    applying a join operation to a first static set of rows from a first database object and a second static set of rows from a second database object; and
    after applying the join operation, using a static set of rows resulting from said applying the join operation as the static set of rows to load into the database buffer cache.

12. The one or more non-transitory computer-readable media of claim 9, storing instructions which, when executed by the one or more processors, further cause:

prior to the executing the clause that requires multiple iterations to execute,
generating a plan to execute the clause that includes:
performing a first database operation that produces a first static set of rows; and
after performing the first database operation, consuming the first static set of rows to perform a second database operation that produces a second static set of rows;
estimating a first computational cost of executing the plan by buffering the first static set of rows;
estimating a second computational cost of executing the plan by buffering the second static set of rows; and
generating a query execution plan based on a lowest estimated computational cost of the first computational cost and the second computational cost.

13. The one or more non-transitory computer-readable media of claim 12, storing instructions which, when executed by the one or more processors, further cause:
generating a plurality of query execution plans that vary an order in which the first and second database operations are executed.

14. The one or more non-transitory computer-readable media of claim 9, wherein executing the query is performed by a plurality of database server instances; wherein each database server instance of the plurality of database server instances has a respective database buffer cache of a plurality of database buffer caches; wherein the one or more non-transitory computer-readable media stores instructions which, when executed by the one or more processors, further cause: distributing the static set of rows across the plurality of database buffer caches.

15. The one or more non-transitory computer-readable media of claim 14, wherein each database server instance of the plurality of database server instances includes at least one respective slave process to execute the query; wherein the one or more non-transitory computer-readable media stores instructions which, when executed by the one or more processors, further cause: locking the respective slave processes from executing other queries while executing the query.

16. A database management system comprising one or more computing devices configured to:
receive a query with an iterative clause that requires multiple iterations to execute;
during compilation of the query, determine, based on the query, a database operation that is:
performed in more than one iteration of executing the iterative clause, and
at least partially performed against a static set of rows, said static set of rows being static during execution of the query;
while executing the query,
load said static set of rows into a database buffer cache; and
perform the database operation in a plurality of iterations, wherein said database operation is performed against the static set of rows loaded into the database buffer cache in an iteration of said plurality of iterations other than a first iteration of said plurality of operations.

17. The database management system of claim 16, comprising the one or more computing devices further configured to:
apply a join operation to a first static set of rows from a first database object and a second static set of rows from a second database object; and
after applying the join operation, use a static set of rows resulting from said applying the join operation as the static set of rows to load into the database buffer cache.

18. The database management system of claim 16, comprising the one or more computing devices further configured to:
generate a plan to execute the clause that includes:
performing a first database operation that produces a first static set of rows; and
after performing the first database operation, consuming the first static set of rows to perform a second database operation that produces a second static set of rows;
estimate a first computational cost of executing the plan by buffering the first static set of rows;
estimate a second computational cost of executing the plan by buffering the second static set of rows; and
generate a query execution plan based on a lowest estimated computational cost of the first computational cost and the second computational cost.

19. The database management system of claim 18, comprising the one or more computing devices further configured to:
generate a plurality of query execution plans that vary an order in which the first and second database operations are executed.

20. The database management system of claim 16, wherein executing the query is performed by a plurality of database server instances; wherein each database server instance of the plurality of database server instances has a respective database buffer cache of a plurality of database buffer caches; wherein the database management system comprises the one or more computing devices further configured to: distribute the static set of rows across the plurality of database buffer caches.

* * * * *

UNITED STATES PATENT AND TRADEMARK OFFICE
CERTIFICATE OF CORRECTION

PATENT NO. : 10,642,831 B2
APPLICATION NO. : 15/268335
DATED : May 5, 2020
INVENTOR(S) : Ziauddin et al.

It is certified that error appears in the above-identified patent and that said Letters Patent is hereby corrected as shown below:

On the Title Page

Column 2, item (56) under Other Publications, Line 1, delete "Entires"," and insert -- Entries", --, therefor.

On page 3, Column 2, item (56) under Other Publications, Line 45, delete "Interiview" and insert -- Interview --, therefor.

In the Drawings

On sheet 6 of 11, in FIG. 3D, Line 5, delete "e,tnoes_tw" and insert -- e, tnodes_tw --, therefor.

In the Specification

In Column 2, Line 10, delete "execute." and insert -- execute; --, therefor.

In Column 7, Line 40, delete "commited." and insert -- committed. --, therefor.

In Column 12, Line 14, delete "><represents" and insert -- >< represents --, therefor.

In Column 14, Line 38, after "According" insert -- to --.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*